2,991,014
METHOD FOR CONTROLLING SMOG

Leonard John Minnick, Cheltenham, Pa., assignor to G. & W. H. Corson, Incorporated, Plymouth Meeting, Pa., a corporation of Delaware
No Drawing. Filed Aug. 31, 1960, Ser. No. 53,033
4 Claims. (Cl. 239—2)

The present invention relates to a method for treating the atmosphere to counteract noxious, air-borne waste, and more particularly, to a novel method for overcoming the "smog" problem by dispersing a particular type of finely divided lime in the atmosphere. This application is a continuation-in-part of application Serial No. 725,524 filed April 1, 1958.

In most industrial areas and areas of high population density, the surrounding atmosphere contains a substantial concentration of air-borne waste produced for the most part by operation of vast numbers of gasoline-burning motor vehicles, and by industrial plants utilizing common industrial fuels, such as coal, gas and oil. This air-borne waste comprises noxious gases and finely divided solid and liquid particles of waste material which are highly dispersed in the surrounding atmosphere. In most industrial and high population density areas, air-borne waste appears as a haze which varies in density with the rate of air pollution and climatic conditions. In certain areas, peculiar geographic and climatic conditions inhibit the tendency of air-borne waste to disperse and diffuse into the upper air strata; thus, the concentration of air-borne waste products builds up in the air basin, for example to as high as from about 2 to $3 \times 10^9$ particles per cubic foot of air, with the result that the familiar haze takes on the appearance of a relatively dense fog, commonly referred to as "smog."

It is believed that to a considerable extent these air-borne pollutants comprise unsaturated hydrocarbons (in association with nitrogen oxides, sulfur oxides, etc.), and under the influence of sunlight, oxygen and ozone, form undesirable derivatives, such as aldehydes, ozonides, and various organic acids which are extremely irritating to mucous membrane of the body, such as the membrane of the eyes and respiratory system. When these pollutants are present in the atmosphere in extremely high concentrations, as for example in concentrations producing the well known "smog," eye and lung irritation can be severe, and the health of an entire community may be endangered. Considerable effort has been expended in combatting the "smog" problem. However, these efforts for the most part have not produced satisfactory results, and generally are directed to preventing the formation and exhausting of air-borne waste into the atmosphere during times when climatic conditions favor the formation of "smog," which type effort obviously undesirably restricts man's activities, e.g. motor vehicle operation, in today's highly organized industrial society.

It is the principle object of this invention to provide a method for treating the atmosphere with a substantially stable aerosol comprising a microcrystalline calcium compound to counteract noxious air-borne waste.

Another object of this invention is the provision of a method for overcoming the "smog" problem by dispersing in the atmosphere colloidal sized particles of a microcrystalline calcium compound of particular physical and chemical properties.

A further object of this invention is the provision of a method for preventing the build up of finely divided air-borne waste in the atmosphere thereby preventing the formation of "smog," by means of a substantially stable aerosol comprising a calcium compound of specified composition.

Still another object of this invention is a method for overcoming the "smog" problem which utilizes inexpensive, readily available materials and relatively inexpensive equipment for dispersing these materials in the atmosphere.

Other objects of this invention will become apparent from a consideration of this specification and claims.

According to the broader aspects of this invention, there is provided a method for treating the atmosphere to counteract noxious air-borne waste which comprises, dispersing in the atmosphere a microcrystalline calcium compound of the formula:

$$Ca(OH)_2 \cdot nMgO$$

in which $n$ is 0 to 1, having an effective particle size of colloidal dimensions in the range between about 0.1 and about 10 microns, a neutralization coefficient not exceeding about the difference between 13,000 p.p.m. and 3000 p.p.m. times the value of $n$ in said formula, and which is substantially non-reactive with atmospheric carbon dioxide to provide a substantially stable aerosol wherein the amount of calcium compound is sufficient to provide a substantially non-acid atmosphere.

As indicated above, air-borne waste for the most part comprises a mixture of highly dispersed gaseous and finely divided liquid and solid particles resulting, as for example from the combustion of coal, oil and gasoline, and from the operation of equipment involving the use of these materials. The extremely fine solid and liquid particles of air-borne waste are in a highly dispersed state in the atmosphere, the mixture forming an aerosol in which these minute solid and liquid waste particles comprise the disperse phase and the atmosphere comprises the disperse medium. The proportion of finely divided solid particles to total waste in these aerosols is generally relatively low. The irritation of mucous membrane, such as that of the eyes and the respiratory system, caused by contact with air-borne waste, particularly those high concentrations of waste which produce "smog," is believed to be due in great measure to the presence of undesirable organic derivatives, such as aldehydes, ozonides, and various organic acids, produced by photosynthesis reactions involving unsaturated hydrocarbons in air-borne waste in association with nitrogen oxides, sulfur oxides, ozone, etc. These photosynthesis reactions appear to occur readily and in fact are promoted under acidic atmospheric conditions caused by the presence of acidic substances present in air-borne waste.

It has been found that noxious, air-borne waste can be counteracted and the serious problem of "smog" can be overcome by dispersing in the atmosphere certain microcrystalline calcium compounds in the form of colloidal size particles. According to the method of this invention, such calcium compounds may be dispersed in the atmosphere in order to prevent the formation and build up in concentration of highly irritating air-borne waste products, and/or to remove from the atmosphere such noxious materials whose presence is indicated by haze, and more particularly "smog."

By reason of the fact that noxious air-borne waste may be counteracted by dispersing in the atmosphere colloidal size particles of calcium compounds of the formula $Ca(OH)_2 \cdot nMgO$, in which $n$ is 0 to 1, it is believed that the dispersed particles dissociate to a substantial degree, and the resulting metallic cations, e.g. $Ca^{++}$ and also $Mg^{++}$ if present, neutralize the electric charge on the dispersed particles of waste, causing them to coalesce and precipitate out of suspension in the atmosphere. It appears that as high as several thousand waste particles may associate with each particle of calcium compound. Due to this strong coagulating effect exhibited by divalent calcium and magnesium ions, only a relatively low concentration of calcium compound in the atmosphere is required. This is particularly advantageous since maintaining the total solids concentration of the atmosphere at a minimum is extremely desirable. It is also believed that the neutralization of the electric charge on the waste particles by adsorption on dissociated particles of the calcium compound occurs most readily in a non-acid atmosphere, i.e., a neutral to somewhat alkaline atmosphere. Apparently, dissociated particles of the calcium compound in suitable concentration provide such a non-acid atmosphere which promotes the coalescence and precipitation of noxious air-borne waste particles from the atmosphere. In this manner, irritating air-borne waste is effectively removed from the atmosphere.

In addition to the above-described action the colloidal size particles of calcium compound exert in removing noxious waste from the atmosphere, it is believed that the previously-described photosynthesis reactions which produce organic compounds which cause irritation of mucous membranes are substantially inhibited, and in many instances, entirely prevented by the neutralization of acidic substances present in air-borne waste by the dissociated particles of calcium compound. Thus, the method of this invention not only removes irritating air-borne waste substances from the atmosphere, but actively interferes with the formation of these obnoxious substances.

Applicant's finding is that noxious, air-borne waste can be counteracted by means of certain types of calcium compounds in the form of colloidal size particles, and although he believes that the problem of air-borne waste, and more particularly "smog," is effectively overcome according to the above-described mechanisms; nevertheless, he does not wish to be bound by this theory.

As stated above, the calcium compounds which may be employed in the method of this invention have the formula:

$$Ca(OH)_2 \cdot nMgO$$

in which $n$ is 0 to 1. These calcium compounds have a microcrystalline structure and may be prepared by hydration of a calcium compound of the formula:

$$CaO \cdot nMgO$$

in which $n$ is 0 to 1, with about one mol of water for each mol of calcium in the calcium compound thereby providing a substantially dry powder. This hydration is carried out under conditions which substantially exclude atmospheric carbon dioxide. Ordinarily in such calcium compounds, $n$ will be from about 0 to 0.2 and from about 0.9 to 1. In a preferred calcium compound for use according to this invention $n$ is equal to about 1.

The effective size of the particles of calcium compound is particularly important to the success of the method of this invention. By the expression "effective size" as used in this specification and claims is meant the actual size of the particles in dispersed condition whether the particles are discrete ultimate particles or agglomerates. The particles should be of effective colloidal size so that when dispersed in the atmosphere there is formed a substantially stable aerosol. In other words, the particles in air form a substantially stable colloidal system (substantially non-settling) in which air is the continuous phase, and this system remains substantially stable until the particles of calcium compound become associated with a sufficient number of air-borne waste particles to enable coalescence and precipitation of the resulting reaction products to take place. Ordinarily the particles should have an effective particle size in the range between about 0.1 and 10 microns, and preferably between about 0.1 and 1 micron.

Another important characteristic of the calcium compounds used in this invention is their ability to rapidly neutralize acidic materials. As pointed out previously, undesirable photosynthesis reactions which take place in the atmosphere involving unsaturated organic compounds are promoted by acidic atmospheric conditions. However, the calcium compounds employed in the method of this invention advantageously rapidly render the atmosphere neutral or somewhat alkaline under which conditions these photosynthesis reactions are inhibited and coalescence of waste particles are enhanced. When the two aerosols, i.e. the aerosol comprising noxious waste particles and the aerosol comprising the calcium compound, are brought into proximity, neutralizing reactions should take place promptly.

In order for this prompt neutralization of acidic materials dispersed in the atmosphere to take place, the calcium compound should have a neutralization coefficient in p.p.m. not exceeding the difference between about 13,000 p.p.m. and 3000 p.p.m. times the value of $n$ in the formula $Ca(OH)_2 \cdot nMgO$.

This neutralizing coefficient represents the parts of the calcium compound required to neutralize one million parts by weight of sulfuric acid standard solution (1.5%) to a pH of 4.4 in ten minutes. This determination of the neutralization coefficient should be made in accordance with applicable sections of A.S.T.M. designation: C400, issued 1957. The neutralization coefficient is obtained by the following formula:

$$N = \frac{1.5}{Z} \times X \times 1000$$

wherein N is the neutralization coefficient in p.p.m., X is the grams of calcium compound per liter of $H_2SO_4$ (1.5%) required to achieve a pH of 4.4 in ten minutes, and Z is the concentration of $H_2SO_4$ to the nearest 0.005%, as determined by analysis.

The calcium compounds used in the invention are substantially non-reactive with atmospheric carbon dioxide. By "non-reactive" is meant that the calcium compounds either do not react with atmospheric carbon dioxide to form calcium carbonate or react so slowly therewith that less than about 1% is converted to carbonate even after exposure to atmospheric carbon dioxide for a period of several hours, e.g. 5 hours.

The particles of calcium compound may be dispersed in the atmosphere as a dry powder or sprayed as a slurry, such as an aqueous slurry. When dispersed in the form of a slurry, the slurry should preferably have a high solids content in order that vast volumes of the slurry need not be dispersed to provide the atmosphere with the necessary particle concentration. A satisfactory aqueous slurry is one having a solids concentration of from about 30% to 50%, by weight. Whether dispersed as a dry powder or slurry, the particles are of the stated effective size and composition heretofore described.

As was pointed out above, it is now believed that by dispersing in the atmosphere a sufficient quantity of the stated calcium compounds to provide a non-acid atmosphere, i.e., a neutral to somewhat alkaline atmosphere, the concentration of air-borne waste can be effectively reduced, and photosynthesis reactions which are believed to produce highly irritating organic compounds can be prevented from taking place. The amount of colloidal calcium compound to effectively counteract air-borne waste, will, of course, depend upon a number of factors such as concentration of air-borne waste, rate of diffusion of waste into the upper air strata, rate of addition of waste substances to the atmosphere, acidity of the atmosphere, and the like. As stated above, suffiicent calcium compound should be dispersed in the atmosphere to provide a non-acid atmosphere, and preferably, a mildly alkaline atmosphere. The relative acidity or alkalinity of the atmosphere may be determined by means well known to the skilled chemist, as for example by contacting air samples with wet indicator papers, by bubbling such samples through water and thereafter determining the pH of the water, or by deriving it from measurements of the electric conductivity of such air samples. A non-acid atmosphere can be obtained, in most instances, by dispersing in the atmosphere sufficient calcium compound to provide a concentration of from about .001 to about 1 part by volume thereof per million parts of air in the area treated. Of course, a concentration in the upper portion of this range may be necessary for treating an atmosphere having a high concentration of air-borne waste, as is present in "smog," to render the atmosphere in a substantially non-acid and preferably neutral to somewhat alkaline condition. The above-mentioned factors such as rate of addition of waste to and rate of dissipation of waste from the atmosphere, etc., should also be considered in order to maintain the atmosphere in a substantially non-acid condition. Since a high solids concentration in the atmosphere is undesirable, excessive addition of finely divided material to the atmosphere should be avoided.

In certain situations supplemental treatment of the atmosphere with various materials, such as agglomerating agents, settling agents, etc., which do not adversely affect the beneficial action of the calcium compound may be desirable. For example, the atmosphere may be treated with rain-inducing materials, ammonia, ammonia forming mixtures, and polyvalent cations, such as aluminum and iron, which induce precipitation of air-borne waste in a manner similar to calcium and magnesium. These materials may be dispersed in the atmosphere by a step which is entirely separate from the dispersing of the calcium compound in the atmosphere, or these materials may be mixed with the compound, if their physical form makes them capable of admixture, and the mixture dispersed in the atmosphere.

The method of dispersing the calcium compound in the atmosphere to counteract noxious air-borne waste may be carried out in a variety of ways, an essential feature being that this colloidal material be widely dispersed in that portion of the atmosphere which is to be treated. For example, one method of dispersing in the atmosphere is to introduce it in waste products exhausted into the atmosphere, such as combustion products, at or about the point of discharge of such products into the atmosphere. Due to the tremendous volume of gaseous waste products from industrial plants, it is extremely advantageous to use such waste products as the vehicle for carrying the particles of calcium compound into the atmosphere. Preferably the gaseous waste products in which the calcium compound is dispersed have a temperature below the dew point for such products. By means of an eductor-type device attached to a discharge stack, the calcium compound in powdered form or in the form of an aqueous slurry may be educted into the combustion products in the stack and caused to escape into the atmosphere with the combustion products. Another suitable method involves forming a dispersion of the particles in steam and injecting this dispersion into an industrial discharge stack by means of a steam injector. The gaseous discharge from the stack containing the colloidal particles would then be diffused into the surrounding atmosphere where the calcium compound would counteract noxious air-borne waste. Advantageously, sufficient calcium compound may be introduced into the gaseous effluent from the combustion of fuel not only to counteract air-borne waste already in the atmosphere, but also to neutralize acidic materials in the combustion products and cause precipitation of solid and liquid particles of waste in such effluent, thereby substantially interfering with an even preventing the introduction of noxious materials into the atmosphere. In neutralization of acidic materials in stack effluent, innocuous calcium compounds, which are substantially chemically neutral, may be released into the atmosphere which may serve as possible nuclei for conversion of highly dispersed non-solid waste products in the atmosphere to more or less dust-like products which precipitate from the atmosphere. It is thus seen that by dispersing colloidal calcium compounds in waste combustion products of industrial operations, the active colloidal material is not only delivered to the atmosphere in active form along with the industrial effluent, but the colloidal material tends to prevent formation and exhaust into the atmosphere of irritating waste materials.

Another method for the colloidal calcium compounds in the atmosphere is to employ a spray, which may be in the form of a dust or dispersed in aqueous medium, directly into the atmosphere by means of conventional dispersing and spraying equipment located at ground stations, or by means of aircraft equipped with suitable dispersing equipment. Ground stations for dispersing the colloidal calcium compound preferably may be strategically located so that the material dispersed in the atmosphere will come into contact with acidic materials at points close to the discharge of such acidic materials into the atmosphere. In this way, the build up in concentration of air-borne waste will be substantially prevented.

Various modifications in the manner in which the colloidal calcium compound is dispersed in the atmosphere and in the particular compound used and not specifically described above are within the purview of this invention if included within the meaning of the appended claims.

What is claimed is:

1. A method for treating the atmosphere to counteract noxious air-borne waste which comprises dispersing in the atmosphere a microcrystalline calcium compound of the formula:

$$Ca(OH)_2 \cdot nMgO$$

in which $n$ is 0 to about 1 having an effective particle size of colloidal dimensions in the range between about 0.1 to 10 microns, a neutralization coefficient not exceeding about the difference between 13,000 p.p.m. and 3000 p.p.m. times the value of $n$ in said formula, and which is substantially non-reactive with atmospheric carbon dioxide to provide a substantially stable aerosol wherein the amount of calcium compound is sufficient to provide a substantially non-acid atmosphere.

2. The method according to claim 1 in which the value for $n$ in the formula for the calcium compound is about 1.

3. The method according to claim 1 in which there is dispersed in the atmosphere from about .001 to about 1 part by volume of calcium compound per million parts of air.

4. The method according to claim 1 in which said calcium compound has an effective particle size in the range between about 0.1 and 1 micron.

References Cited in the file of this patent

Rain Making, by W. J. Humphreys (1926), pages 57–58.

"On the Local Dissipation of Natural Fog," by H. G. Houghton and W. H. Redford, volume VI, number 3, of Papers in Physical Oceanography and Meteorology, published by Massachusetts Institute of Technology, page 22.